(12) United States Patent
Nakamori et al.

(10) Patent No.: US 11,016,324 B2
(45) Date of Patent: May 25, 2021

(54) DISPLAY DEVICE HAVING AN ADHESIVE MEMBER

(71) Applicant: Japan Display Inc., Tokyo (JP)

(72) Inventors: Yosuke Nakamori, Tokyo (JP); Ken Hirabayashi, Tokyo (JP); Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/710,663

(22) Filed: Dec. 11, 2019

(65) Prior Publication Data

US 2020/0117041 A1 Apr. 16, 2020

Related U.S. Application Data

(63) Continuation of application No. 15/622,930, filed on Jun. 14, 2017, now Pat. No. 10,534,213.

(30) Foreign Application Priority Data

Jun. 15, 2016 (JP) .................. 2016-119008

(51) Int. Cl.
*G02F 1/1333* (2006.01)
*G02F 1/13357* (2006.01)
*G02F 1/1343* (2006.01)

(52) U.S. Cl.
CPC ........ *G02F 1/13338* (2013.01); *G02F 1/1336* (2013.01); *G02F 1/133308* (2013.01); *G02F 1/134309* (2013.01); *G02F 1/133317* (2021.01); *G02F 2201/54* (2013.01); *G02F 2202/28* (2013.01); *G06F 2203/04105* (2013.01)

(58) Field of Classification Search
CPC combination set(s) only.
See application file for complete search history.

(56) References Cited

U.S. PATENT DOCUMENTS

| 6,181,071 | B1 | 1/2001 | Yuuki et al. |
| 2001/0050735 | A1 | 12/2001 | Yajima et al. |
| 2008/0107887 | A1 | 5/2008 | Kim |
| 2011/0175845 | A1 | 7/2011 | Honda et al. |
| 2013/0300974 | A1* | 11/2013 | Yoshimoto ........ G02F 1/133528 349/58 |

(Continued)

FOREIGN PATENT DOCUMENTS

| JP | 09-318952 A | 12/1997 |
| JP | 2011-100364 A | 5/2011 |

*Primary Examiner* — Lauren Nguyen
(74) *Attorney, Agent, or Firm* — K&L Gates LLP

(57) ABSTRACT

A display device is provided and includes a liquid crystal panel comprising a pair of substrates, a liquid crystal layer between the substrates, a first electrode portion and a pair of polarizers that sandwich the substrates; a backlight device comprising a casing including a support frame, a bottom plate, a light guide, at least one optical sheet on the light guide, and a light source in the casing; and an adhesive member between the liquid crystal panel and the backlight device, wherein the support frame includes a step portion on which the optical sheet is placed, the adhesive member comprises a back surface fixed over the optical sheet and the support frame, and a top surface fixed to one of the polarizers, and a width of the adhesive member is as same as a width of the support frame.

10 Claims, 6 Drawing Sheets

(56) References Cited

U.S. PATENT DOCUMENTS

| | | | |
|---|---|---|---|
| 2014/0092339 A1* | 4/2014 | Yoshimura | G02F 1/133308 349/58 |
| 2015/0131028 A1* | 5/2015 | Oh | G02B 6/005 349/65 |
| 2016/0043336 A1* | 2/2016 | Kim | H01L 51/003 257/40 |

* cited by examiner

DISPLAY DEVICE HAVING AN ADHESIVE MEMBER

CROSS-REFERENCE TO RELATED APPLICATIONS

This application is a continuation application of U.S. patent application Ser. No. 15/622,930, filed on Jun. 14, 2017, which application is based upon and claims the benefit of priority from Japanese Patent Application No. 2016-119008, filed Jun. 15, 2016, the entire contents of which are incorporated herein by reference.

FIELD

Embodiments described herein relate generally to a backlight device and a display device equipped with the same.

BACKGROUND

Recently, liquid crystal display devices have been widely employed as display devices for smartphones, personal digital assistants (PADs), tablet computers, car navigation systems and the like. In general, a liquid crystal display device comprises a liquid crystal display panel and a planar lighting device (backlight device) overlaid on a rear surface of the liquid crystal display panel to illuminate the liquid crystal display panel. A conventional backlight device comprises a reflection layer, a light guide, an optical sheet, a light source such as an LED, and a rectangular mold frame. The reflection layer, the light guide, and the optical sheet are overlaid and stacked on each other, and disposed inside the mold frame.

In addition, a liquid crystal display device having a force sensing function of sensing the pressing force input on its display surface and executing an arbitrary operation based on the force sensing has been proposed. A variation in distance between two electrodes provided in the liquid crystal display device is read as an electrostatic capacity variation, which is considered as capacitance-type input sensing for sensing the pressing force. For this reason, that a decent amount of stroke between the two electrodes is linearly varied to the pressing force in the thickness direction (external force in the thickness direction) needs to be secured.

SUMMARY

The present disclosure generally relates to a backlight device and a display device equipped with the same.

According to an embodiment, a display device includes a liquid crystal panel including a pair of substrates opposed to each other, a liquid crystal layer between the substrates, and a first electrode portion on at least one of the substrates, a backlight device including an optical member and a second electrode portion opposed to the first electrode portion, and an adhesive member between the liquid crystal panel and the backlight device to fix the backlight device to the liquid crystal panel. The adhesive member includes a first base, adhesive layers on both surfaces of the first base, a second base on the first base via one of the adhesive layers, and an adhesive layer on the second base.

Additional features and advantages are described herein, and will be apparent from the following Detailed Description and the figures.

DETAILED DESCRIPTION

Figure 1:
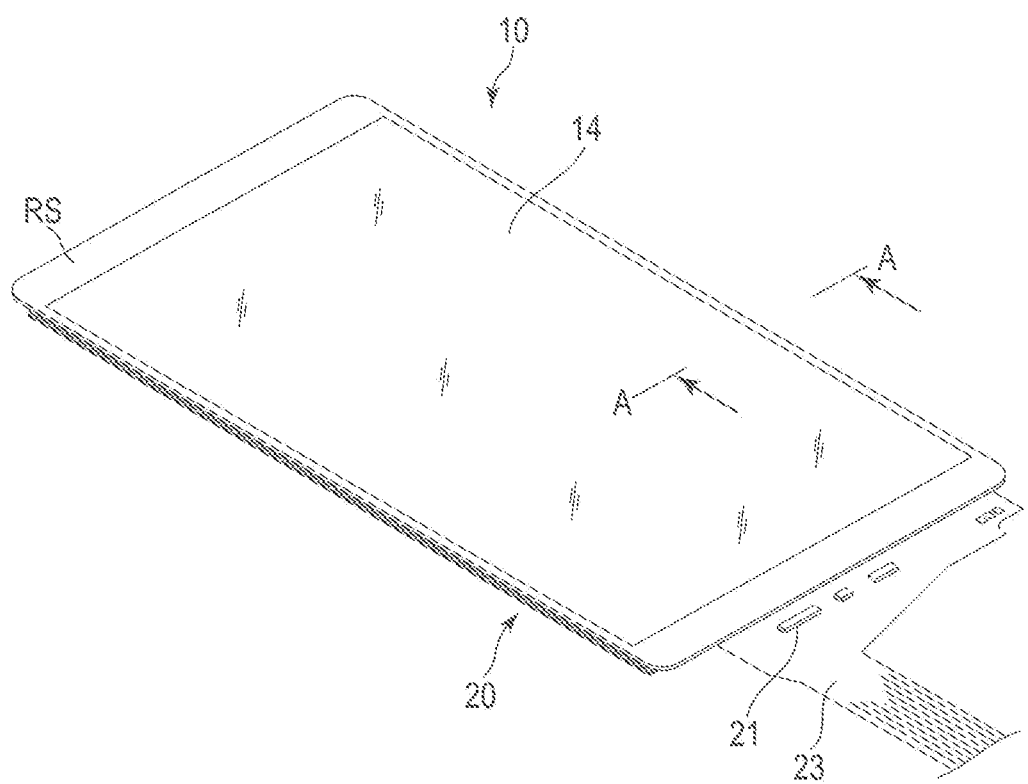
FIG. 1 is a perspective view showing a display surface side of a liquid crystal display device according to a first embodiment.

Various embodiments will be described hereinafter with reference to the accompanying drawings. In general, according to one embodiment, a display device comprises a liquid crystal panel comprising a pair of substrates opposed to each other, a liquid crystal layer between the substrates, and a first electrode portion on at least one of the substrates; a backlight device comprising an optical member and a second electrode portion opposed to and spaced apart from the first electrode portion; and an adhesive member between the liquid crystal panel and the backlight device to fix the backlight device to the liquid crystal panel. The adhesive member comprises a first base, adhesive layers on both surfaces of the first base, a second base on the first base via one of the adhesive layers, and an adhesive layer on the second base.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
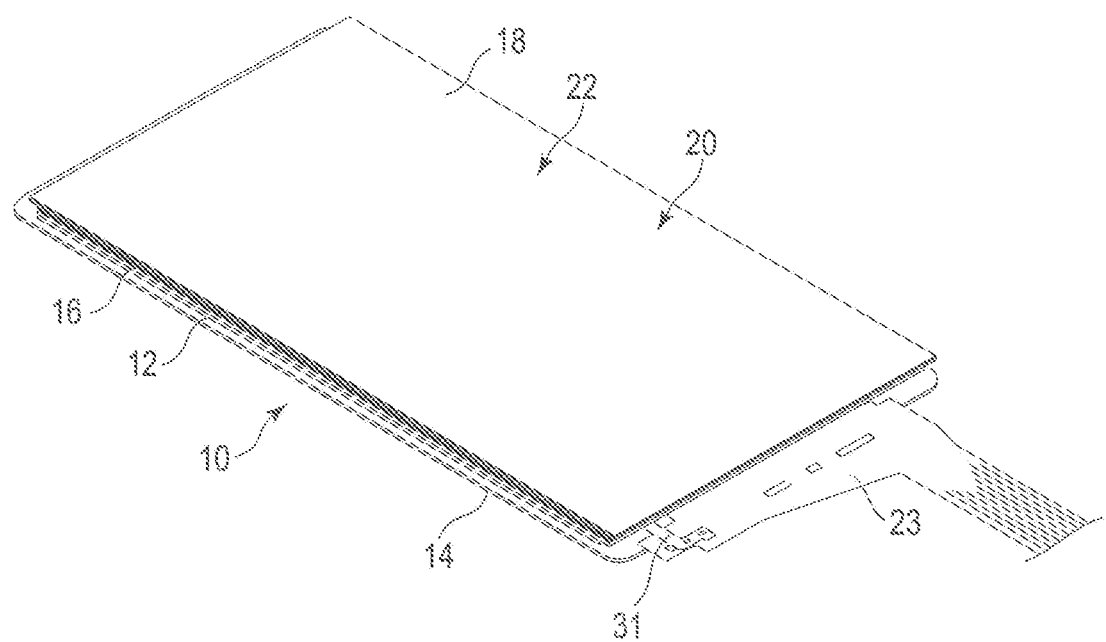
FIG. 2 is a perspective view showing a rear surface side of the liquid crystal display device.
Figure 3:
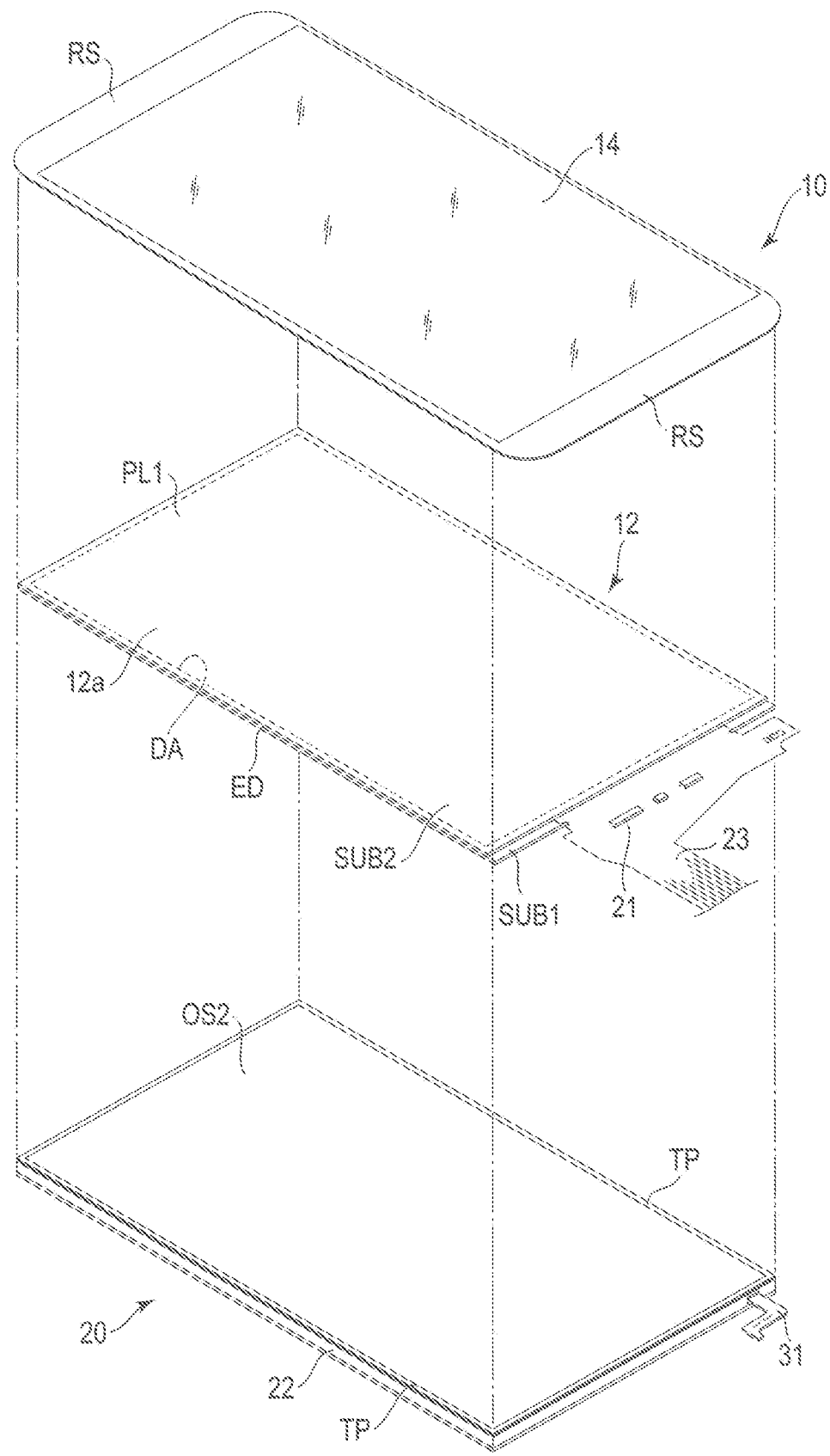
FIG. 3 is an exploded perspective view showing the liquid crystal display device.

FIG. 1 and FIG. 2 are perspective views showing a display surface side and a rear surface side of a liquid crystal display device according to a first embodiment, respectively, and FIG. 3 is an exploded perspective view showing the liquid crystal display device.

A liquid crystal display device 10 can be used after built in, for example, various electronic devices such as smartphones, tablet terminals, cell phones, notebook computers, portable game consoles, electronic dictionaries, TV receivers, and car navigation systems.

As shown in FIG. 1 to FIG. 3, the liquid crystal display device 10 comprises an active-matrix flat liquid crystal display panel (liquid crystal panel, hereinafter) 12, a transparent cover panel 14 overlaid on a display surface 12a which is one of flat surfaces of the liquid crystal panel 12 to cover the entire display surface 12a, and a backlight unit (backlight device) 20 oppositely disposed on the rear surface side which is the other flat surface of the liquid crystal panel 12.

Figure 5:
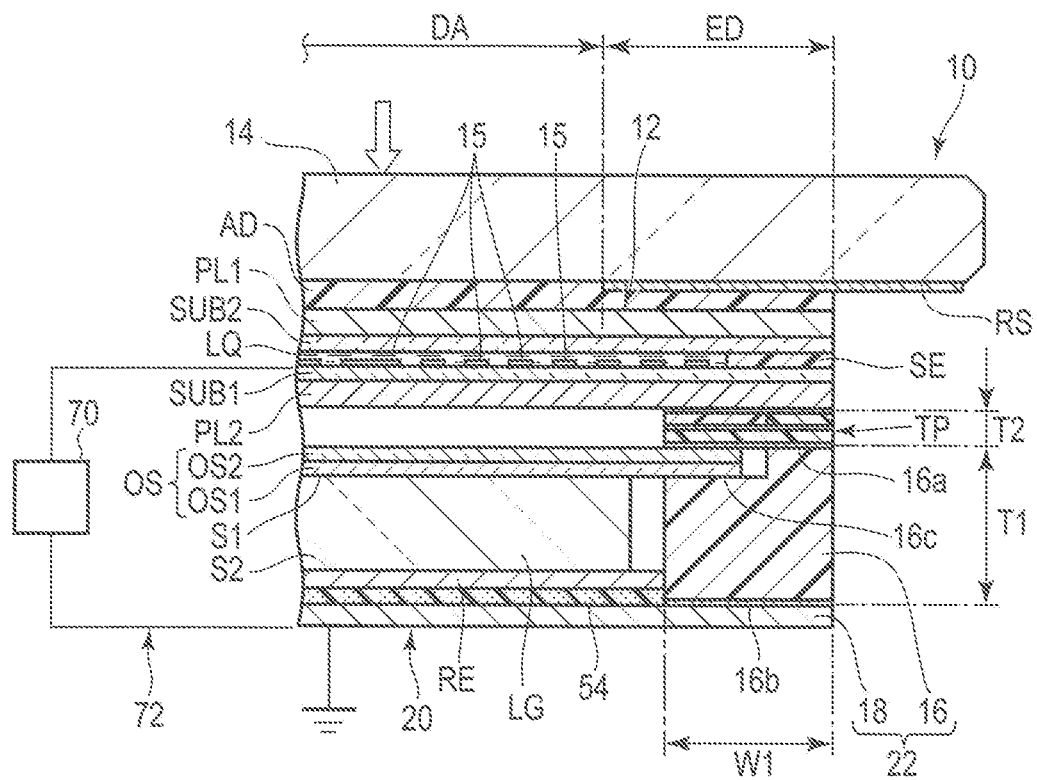
FIG. 5 is a cross-sectional view showing the liquid crystal display device taken along line A-A of FIG. 1.

FIG. 5 is a cross-sectional view showing the liquid crystal display device seen along line A-A of FIG. 1. As shown in FIG. 3 and FIG. 5, the liquid crystal panel 12 comprises a first substrate SUB1 shaped in a rectangular flat plate, a second substrate SUB2 shaped in a rectangular flat plate and opposed to the first substrate SUB1, and a liquid crystal layer LQ sealed between the first substrate SUB1 and the second substrate SUB2. A peripheral portion of the second substrate SUB2 is stuck on the first substrate SUB1 by a sealing member SE. A polarizer PL1 is stuck on a surface of the second substrate SUB2 to form a display surface 12a of the liquid crystal panel 12. A polarizer PL2 is stuck on a surface of the first substrate SUB1 (i.e., the rear surface of the liquid crystal panel 12). In the present embodiment, the polarizers PL1 and PL2 are formed in the same planar size as that of the liquid crystal panel 12 and each of the polarizers covers the entire display surface 12a and the entire rear surface. In addition, a plurality of electrode portions 15 such as pixel electrodes and common electrodes, conductive lines (not shown), and the like are formed on an inner surface of at least one of the substrates, for example, the first substrate SUB1.

On the liquid crystal panel 12, a rectangular display area (active area) DA is provided in a region which is an inner side of a light-shielding layer RS of a cover panel 14 to be explained later, in a planar view of the liquid crystal panel 12 (indicating a state of visually recognizing the liquid crystal panel from a normal direction of the surface of the liquid crystal panel, as mentioned below). An image is displayed in the display area DA. A rectangular frame area (non-display area) ED is provided around the display area DA. The liquid crystal panel 12 is a transmissive display panel comprising a transmissive display function of displaying an image by urging the light from the backlight unit 20 to be selectively transmitted through the display area DA. The liquid crystal panel 12 may be configured to correspond to a lateral electric field mode primarily using an electric field approximately parallel to main surfaces of the substrates or a longitudinal electric field mode primarily using an electric field approximately perpendicular to the main surfaces of the substrates.

In the example illustrated, a flexible printed circuit (FPC) 23 is bonded to a short side end portion of the first substrate SUB1 and extends outwardly from the liquid crystal panel 12. A semiconductor element such as a driver IC chip 21 is mounted on the FPC 23 as a signal supply source which supplies a signal necessary to drive the liquid crystal panel 12.

As shown in FIG. 1 to FIG. 3 and FIG. 5, the cover panel 14 is formed of, for example, a glass plate, acrylic transparent resin or the like and shaped in a rectangular flat plate. The cover panel can also be configured to have four corners formed in an arcuate shape. The cover panel 14 has a width and a length larger than dimensions (width and length) of the liquid crystal panel 12 and has an area larger than the liquid crystal panel 12 in planar view. A frame-shaped light-shielding layer RS is formed on a peripheral portion of the rear surface of the cover panel 14 (i.e., the surface of the liquid crystal panel 12 side). On the cover panel 14, regions other than a region opposed to the display area DA, of the liquid crystal panel 12, are shielded from the light by the light-shielding layer RS. The light-shielding layer RS may be formed on an upper surface (display surface) of the cover panel 14.

The rear surface (back surface) of the cover panel 14 is stuck on the polarizer PL1 of the liquid crystal panel 12 by an adhesive or tackiness agent which has a light transmitting property or which is transparent, for example, an tackiness agent AD formed of optically transparent resin, and entirely covers the display surface 12a of the liquid crystal panel 12. The tackiness agent AD is formed in the same size as the size of the polarizer PL1, aligned and stuck on the polarizer PL1.

When the state of sticking the cover panel 14 on the liquid crystal panel 12 is observed in planar view, the peripheral portion of the cover panel 14 protrudes outwardly from the outer periphery of the liquid crystal panel 12. Long sides of the cover panel 14 and long sides of the liquid crystal panel 12 are approximately parallel to each other and spaced apart at a regular interval. Short sides of the cover panel 14 and short sides of the liquid crystal panel 12 are approximately parallel to each other and spaced apart at a predetermined interval. In the present embodiment, the interval between the long sides of the cover panel 14 and the long sides of the liquid crystal panel 12, i.e., the width of the long-side peripheral portion of the cover panel 14 is formed to be smaller than the interval between the short sides of the cover panel 14 and the short sides of the liquid crystal panel 12, i.e., the width of the short-side peripheral portion of the cover panel.

Figure 4:
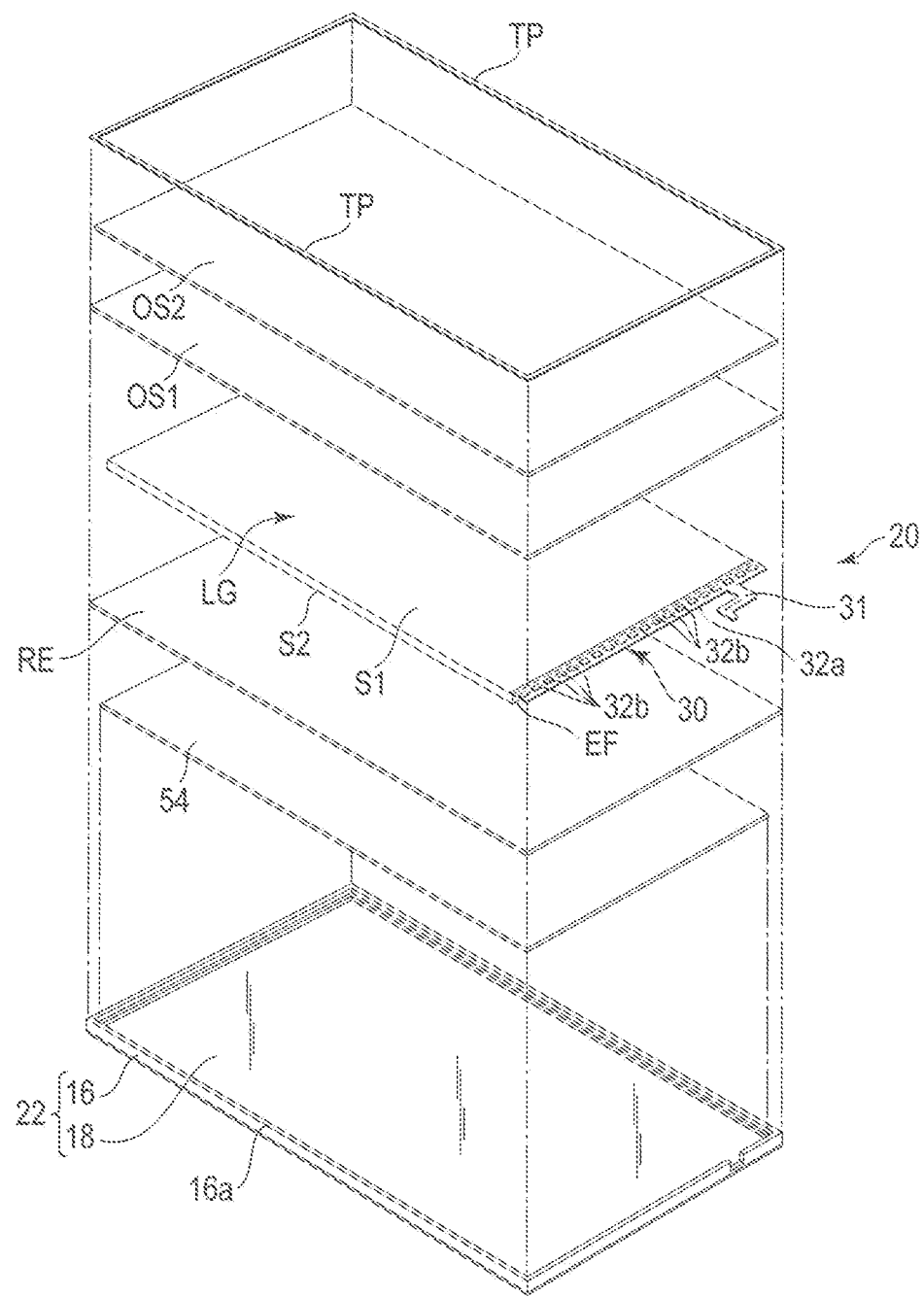
FIG. 4 is an exploded perspective view showing a backlight device.

FIG. 4 is an exploded perspective view showing the backlight unit 20. As shown in FIG. 3, FIG. 4 and FIG. 5, the backlight unit 20 comprises a casing 22 formed in a flat and rectangular shape, a reflective sheet RE disposed on a bottom surface of the casing 22, optical members disposed inside the casing 22, and a light source unit 30 which supplies light made incident on the optical members.

The casing 22 includes a support frame 16 shaped in a rectangular frame, which has a first end surface (upper end surface) 16a and a second end surface (lower end surface) 16b on a side opposite to the first end surface, and a rectangular bottom plate 18 stuck on the second end surface 16b to constitute a bottom of the casing 22. The support frame 16 is a frame formed of, for example, synthetic resin such as polycarbonate (Young's modulus: 2,000 MPa) by molding, having, for example, a width W1 of 0.5 mm and a height T1 of approximately 0.45 mm. In addition, outer dimensions of the support frame 16 are approximately equal to outer dimensions of the polarizer PL2 of the liquid crystal panel 12. The support frame 16 may be formed of an elastic member containing a rubber member (Young's modulus: 4 to 40 MPa).

The support frame 16 includes a lower step portion 16c formed on an inner peripheral side of the first end surface 16a. The height (depth) of the step portion 16c is formed to be approximately equal to thickness of two sheets, i.e., thickness of a first optical sheet OS1 and thickness of a second optical sheet OS2 that will be explained later.

The bottom plate 18 is formed of, for example, a stainless plate (SUS plate) having a thickness of 0.3 mm. By using the stainless plate having the above thickness as the bottom plate, warping (out-of-plane deformation) of the bottom plate 18 to pressing is suppressed. For example, the bottom plate 18 is hardly warped by a pressing force with the user's finger or the like pressing the display area of the cover panel 14. In addition, the bottom plate 18 functions as a second electrode portion for sensing the pressing force as explained later.

According to the present embodiment, a rectangular cushion sheet (cushion member) 54 is laid on the bottom plate 18 of the casing 22. The cushion sheet 54 is formed of, for example, an elastic material such as urethane foam or sponge. The cushion sheet 54 is formed to have outer dimensions approximately equal to the inner dimensions of the support frame 16, and covers an approximately entire surface of the bottom plate 18. A reflective sheet RE and a light guide LG are overlaid and placed in order on the cushion sheet 54. The cushion sheet 54 is provided in a state of being capable of elastically returning. In other words, the cushion sheet 54 has an elastic return force. The cushion sheet 54 is once pressed when the pressing force is input to the cushion sheet 54 via the light guide LG and the reflective sheet RE, and returns to its initial state by the elastic return force when the pressing force is released. The cushion sheet 54 can be accommodated between the reflective sheet RE and the bottom plate 18 in a state of being shrunk such that the cushion sheet is shrinkable.

The reflective sheet RE is formed to have outer dimensions approximately equal to the inner dimensions of the support frame 16 and covers an approximately entire surface of the bottom plate 18 and the cushion sheet 54. A reflective sheet having a thickness of 200 □m or less, desirably, 50 to 90 □m and having a reflectance of 90% or more, desirably, 95% or more is used as the reflective sheet RE. The backlight unit 20 comprises as optical members a light guide LG in a rectangular shape in planar view and a plurality of, for example, two optical sheets, i.e., a first optical sheet OS1 and a second optical sheet OS2 overlaid on the light guide LG. The number of optical sheets is not limited to two but three or more optical sheets may be used.

The light guide LG has a first main surface S1 serving as an emission surface, a second main surface S2 on a side opposite to the first main surface S1, and an incidence surface EF connecting the first main surface S1 with the second main surface S2. In the present embodiment, one of short-side surfaces of the light guide LG is regarded as the incidence surface EF. The light guide LG is formed to have outer dimensions (length and width) which are slightly smaller than the inner dimensions of the support frame 16 and slightly larger than the display area DA of the liquid crystal panel 12. The light guide LG is disposed in the support frame 16 and placed on the reflective sheet RE, in a state in which the second main surface S2 side is opposed to the reflective sheet RE. A light guide having a thickness in a range of, for example, approximately 0.23 to 0.32 mm is used as the light guide LG. The light guide LG is formed of, for example, comparatively soft resin (Young's modulus: 16 MPa) such as acrylic or silicon-based resin, and is warped by a pressing force with which, for example, the user presses the display area of the cover panel 14 of the liquid crystal panel by a finger or the like.

The incidence surface EF of the light guide LG is opposed to the short side portion of the support frame 16 and spaced apart from the short side portion at a small gap. As shown in FIG. 4, the light source unit 30 comprises, for example, a circuit board 32a formed in an elongated strip shape and light sources (for example, LEDs) 32b mounted and arranged on the circuit board 32a. The light source unit 30 is disposed in the support frame 16 such that the light sources 32b are opposed to the incidence surface EF of the light guide LG.

As shown in FIG. 3 to FIG. 5, the diffusion sheet and a prism sheet formed of, for example, comparatively soft synthetic resin (Young's modulus: 16 MPa) such as acrylic or silicon-based resin and having the light transmitting property are used as the first optical sheet OS1 and the second optical sheet OS2, in the present embodiment. For this reason, the first optical sheet OS1 and the second optical sheet OS2 are warped by a pressing force with which, for example, the user presses the display area of the cover panel 14 of the liquid crystal panel by a finger or the like. The first optical sheet OS1 is formed in a rectangular shape having the outer dimensions slightly smaller than the outer dimensions of the support frame 16.

The first optical sheet OS1 is placed on the first main surface S1 of the light guide LG. In addition, a peripheral portion of the first optical sheet OS1 is placed on the step portion 16c of the support frame 16. The second optical sheet OS2 is placed on the first optical sheet OS1 and a peripheral portion of the second optical sheet OS2 is overlaid on the first optical sheet OS1 and placed on the step portion 16c of the support frame 16. An upper surface of the peripheral portion of the second optical sheet OS2 is arranged with the first end surface 16a of the support frame 16 in the same plane, i.e., arranged to be flush with the first end surface 16a of the support frame 16 by overlaying the peripheral portion of the first optical sheet OS1 and the peripheral portion of the second optical sheet OS2 on the step portion 16c.

A diffusion sheet is employed as the first optical sheet OS1 and a prism sheet is employed as the second optical sheet OS2. The prism sheet employs a structure of stacking and adhering two prism sheets while making orientations of their prisms orthogonal to each other, and can also employ a structure of not adhering but simply stacking the prism sheets. In this case, three optical sheets are considered to be stacked on the light guide LG.

The backlight unit 20 comprises an adhesive member (for example, a double-faced tape) TP formed in a rectangular frame shape to stick the backlight unit 20 to the liquid crystal panel 12. The adhesive member TP is formed in the rectangular frame shape having the same width as the support frame 16 in planar view. The peripheral portions of the optical sheets OS1, OS2 are accommodated at the step portion 16c, and the adhesive member TP is stuck on the first end surface 16a of the support frame 16 and the peripheral portion of the second optical sheet OS2. The second optical sheet OS2 is fixed to the support frame 16 via the adhesive member TP.

In the present embodiment, the wording such as "the same" or "equal" dimensions does not positively exclude an error which cannot be avoided in manufacturing an actual product or estimation of the error as a tolerance in the design, but implies the dimensions which are considered approximately equal from this viewpoint. The wording is also considered similarly in the following descriptions.

Figure 6:
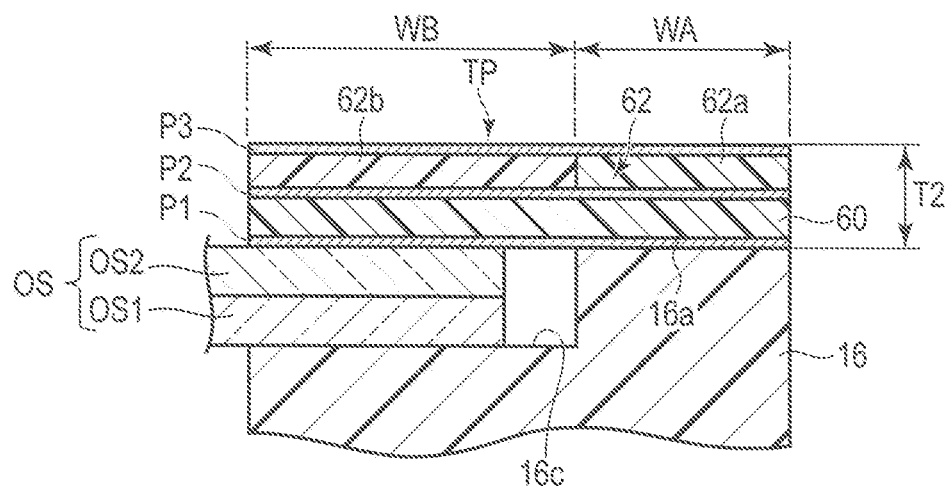
FIG. 6 is an exploded cross-sectional view showing a double-faced tape portion of the backlight device.

FIG. 6 is an exploded cross-sectional view showing the adhesive member TP of the backlight unit. As shown in FIG. 5 and FIG. 6, the adhesive member TP is formed to have a thickness T2 in a range of, for example, approximately 0.08 to 0.1 mm. In the present embodiment, the adhesive member TP includes a first base 60 formed in a strip shape and having adhesive layers (glue) P1 and P2 formed on both surfaces, a second base 62 formed in a strip shape and deposited on the first base 60 via the adhesive layer P2, and an adhesive layer (glue) P3 formed on the upper surface of the second base 62.

The first base 60 is formed in a rectangular frame shape and each of the sides of the first base 60 is formed to have an approximately equal width to the width W of the support frame 16. The first base 60 is formed of, for example, polyethylene terephthalate (PET) (Young's modulus: 3,000 MPa). In contrast, the second base 62 is formed in a rectangular frame shape having substantially the same dimensions as the first base 62. At least several parts or all the parts of the second base 62 are formed of a material softer than the first base 60, for example, acrylic foam, urethane foam, polyethylene foam, a rubber material, a gel material or the like having the Young's modulus of 0.16 MPa or more. In the present embodiment, the second base 62 includes an outer region 62a in a rectangular frame shape and an inner region 62b in a rectangular frame shape, which is arranged inside the outer region 62a. The outer region 62a and the inner region 62b are sequentially arranged in the width direction of the second base 62. The outer region 62a is formed of a comparatively hard material such as PET and the inner region 62b is formed of a material softer than the first base 60. A width WA of the outer region 62a is approximately equal to the width of the first end surface 16a of the support frame 16, and a width WB of the inner region 62b is approximately equal to the width of the step portion 16c of the support frame 16.

The adhesive member TP on the first base 60 side is stuck on the first end surface 16a and the optical sheet OS. In this case, the outer region 62a is opposed to the first end surface 16a, and the soft inner region 62b is opposed to the step portion 16c.

The adhesive member TP may be stuck upside down. In other words, the adhesive member TP on the second base 62 side may be stuck on the first end surface 16a of the support frame 16 and the optical sheet OS. In addition, the entire body of the second base 62 of the adhesive member TP may be formed of the above-mentioned material softer than the first base 60.

The backlight unit 20 configured as explained above is disposed oppositely to the rear surface of the liquid crystal panel 12 and attached to the polarizer PL2 by the adhesive member TP, as shown in FIG. 2, FIG. 3 and FIG. 5. The support frame 16 is stuck on the rear-surface peripheral portion of the polarizer PL2 by the adhesive member TP, and the outer periphery of the support frame 16 and the outer periphery of the adhesive member TP are arranged in a state of being aligned with the periphery of the polarizer PL2 and the periphery of the liquid crystal panel 12.

The support frame 16 is disposed at a position opposed to a frame area ED, and the first optical sheet OS1, the second optical sheet OS2 and the light guide LG are opposed to the display area DA. The optical sheet OS is opposed to and spaced apart from the liquid crystal panel 12 at a gap of the thickness T2 of the adhesive member TP.

A printed circuit board 32 of the light source unit 30 is connected to the FPC 23 via a connection end portion 31 (see FIG. 2). A drive current is thereby made to flow to an LED 34 via the FPC 23 and the printed circuit board 32. Light emitted from the LED 34 is made incident in the light guide LG from the incidence surface EF, propagates inside the light guide LG, or is emitted from the second main surface S2, reflected by the reflective sheet RE and made incident again in the light guide LG. After having passed through these optical paths, the light from the LED 34 is emitted from the entire region of the first main surface (emission surface) S1 to the liquid crystal panel 12 side. The emitted light is diffused by the first optical sheet OS1 and the second optical sheet OS2 and then radiated to the display area DA of the liquid crystal panel 12.

In the present embodiment, the liquid crystal display device 10 comprises a press sensing function of sensing a pressed state of the cover panel 14. For example, the liquid crystal display device 10 comprises a press sensor 72 as shown in FIG. 5. The press sensor 72 comprises a panel-side electrode portion (first electrode portion) 15 composed of common electrodes, detection electrodes or pixel electrodes of the liquid crystal panel 12, a metallic bottom plate 18 of the casing 22 and a controller 70 electrically connected to these portions. The bottom plate 18 is formed of, for example, a stainless plate having a thickness of 0.3 mm and connected to a ground potential to function as a casing-side electrode portion.

A controller 70 transmits a sensor drive signal to either the panel-side electrode portions 15 or the bottom plate 18, for example, the panel-side electrode portions 15. If the user touches the cover panel with a finger or the like, the cover panel 14 is warped by the pressing force generated by the touch. Then, the adhesive member TP is pressed and compressed via the cover panel 14 and the liquid crystal panel 12 by the warp of the cover panel 14. The polarizer PL2 thereby contacts the optical sheet OS soon. Then, the liquid crystal panel 12 presses the light guide LG via the optical sheet OS. Furthermore, the cushion sheet 54 is pressed via the light guide LG and the like and shrunk. The liquid crystal panel 12 is thereby slightly warped toward the bottom plate 18 side about the pressed portion and a distance between each of the panel-side electrode portions 15 and the bottom plate 18 is varied in accordance with the warp. In accordance with the variation in distance, electrostatic capacity between the panel-side electrode portions 15 and the bottom plate 18 is varied, and the controller 70 receives signals including the capacitive variation from either the panel-side electrode portions 15 or the bottom plate 18, for example, the panel-side electrode portions 15. The controller 70 senses the pressed state (pressing force) of the cover panel 14, based on the receive signals.

After that, when the pressing force is released, the cushion sheet 54 returns to its initial state maintained before crushed by the elastic return force, and the other optical members, the liquid crystal panel 12 and the cover panel 14 also return to their initial flat states by the own elasticity.

Thus, in the above embodiment, the interval between a pair of electrodes composed of the panel-side electrode portions 15 and the bottom plate 18 is varied by the action of the pressing force, and the electrostatic capacity variation between the electrodes based on the variation in interval is sensed. In other words, the magnitude of the pressing force is read as the electrostatic capacity variation based on the variation in interval between the electrodes. For this reason, the range of sensing the pressing force can be set widely since the amount of the electrostatic capacity variation becomes larger as the interval between the electrodes is larger. In addition, as the variation in distance between the electrodes to the press is more remarkable, the magnitude of the pressing force can be sensed more accurately. In the present embodiment, the interval between the electrodes is physically increased since the adhesive member TP including two bases 60 and 62 is employed in one of layers holding the interval between a pair of electrodes. The range of sensing the pressing force by the press sensor 72 becomes thereby wider. Furthermore, at least one layer of the adhesive member TP is formed of the base (second base 62)

having a property of cushion. For this reason, the base is crushed by the pressing force, the variation in distance between the electrodes caused by the pressing force is also remarkable, and accuracy in sensing the pressing force is therefore improved.

In addition, the second base 62 of the adhesive member TP of the present embodiment comprises the inner region 62*b* and the outer region 62*a*, and the inner region 62*b* is formed of a material softer than the first base 60. For this reason, the liquid crystal panel 12 is warped more remarkably by the press of the cover panel 14. More specifically, the liquid crystal panel 12 is substantially supported by the support frame 16 via the adhesive member TP. As explained in the present embodiment, the step portion 16*c* is provided on the support frame 16, and the second base 62 of the adhesive member TP has the inner region 62*b* provided to be opposed to the step portion 16*c* and has the outer region 62*a* opposed to the outer peripheral region. For this reason, if the cover panel 14 is pressed, the second base 62 of the adhesive member TP is bent from a joint position between the inner region 62*b* and the outer region 62*a*. Substantially, the press fulcrum of the liquid crystal panel 12 on the support frame 16 moves from the inner edge side of the support frame 16 to a joint portion (or a boundary) between the inner region 62*b* and the outer region 62*a* of the second base 62. Considering the point that the support frame 16 is bonded to the peripheral portion of the display panel 12, an interval between press fulcrums is extended on the liquid crystal panel 12 supported by the support frame 16 via the adhesive member TP. The warping performance of the display panel 12 caused by the press is thereby improved. In addition, since the press fulcrum is provided at a position remote from the display area DA, the display panel 12 can easily be warped in accordance with the press even if the peripheral portion of the display area DA is pressed. As a result, accuracy in sensing the press can also be improved.

The metallic bottom plate 18 is adopted as the casing-side electrode portion in the above embodiment but a structure of providing another metallic or film-shaped electrode on the bottom plate and stacking the electrode on the bottom plate can also be adopted. In addition, a structure of employing the electrodes provided between the pair of substrates as panel-side electrode portions or a structure of providing another electrode layer between the cover panel 14 and the pair of substrates can also be adopted as the structure of the panel-side electrode portions 15. If this structure is adopted, a structure of arraying electrodes in a matrix as the panel-side electrode portions, outputting sensor drive signals to the respective electrodes of the casing-side electrode portion and receiving the receive signals from the panel-side electrode portions, can also be adopted.

In addition, a structure of processing the sensing of the pressed state by the controller 70 can also be adopted or a structure of preliminarily storing a certain amount of the above-explained receive signals in the controller 70 and then urging another processor connected to the liquid crystal panel to process the sensing of the pressed state can also be adopted.

According to the liquid crystal display device 10 and the backlight unit 20 of the present embodiment configured as explained above, the adhesive member TP of the backlight unit 20 is formed to be thick, and a double-layer structure comprising the first base 60 and the second base 62 softer than the first base 60 is employed. For this reason, when the pressing force is input to the cover panel 14, the adhesive member TP is crushed and shrunk and, accordingly, the liquid crystal panel 12 can be displaced to the electrode portion 18 side of the backlight unit (i.e., in the thickness direction of the device). The decent amount of variation in distance between the electrodes caused by the press can be thereby secured and the range of the pressing force which can be sensed can be widened. Furthermore, even if the pressed portion of the liquid crystal panel 12 is at the peripheral portion (i.e., the portion near the support frame 16) which can hardly be comparatively displaced, input of the press there can easily be sensed since the soft inner region 62*b* of the adhesive member TP is easily shrunk and deformed.

Figure 7:
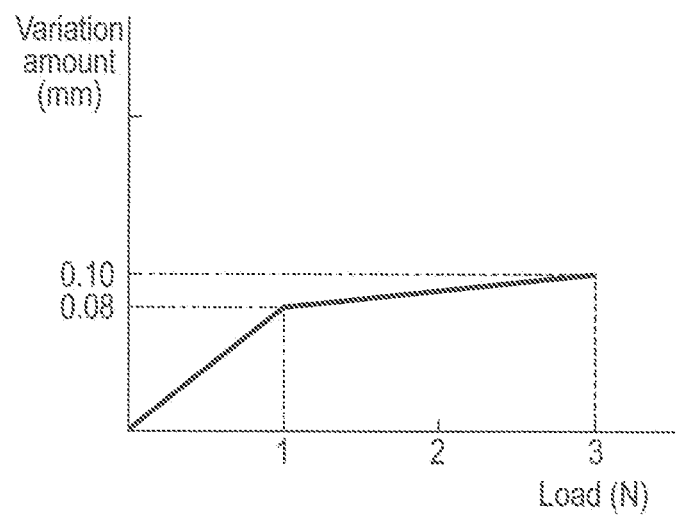
FIG. 7 is a graph showing a relationship between detected load and a variation amount (stroke amount) in a case where load (pressing force) is applied in the thickness direction of the liquid crystal display device.

A cushion sheet 54 is provided between the light guide LG and the bottom plate (unit-side electrode portion) 18 of the casing 22. When the liquid crystal panel 12 and the light guide LG are pressed, the cushion sheet 54 is pressed and compressed (shrunk) in the thickness direction by the light guide LG. The stroke amount or variation amount of the liquid crystal panel 12 is further increased in accordance with the shrinkage. As shown in FIG. 7, for example, the variation amount of 0.08 mm can be obtained for the press load 1N by the deformation of the adhesive member TP, the variation amount of 0.10 mm can be further obtained by shrinkage of the cushion sheet 54 and, as a result, the press load of up to approximately 3N can be sensed.

In the present embodiment, the support frame 16, the light guide LG and the optical sheet OS are formed of a comparatively soft material, i.e., a material having a small Young's modulus. For example, the support frame 16 is formed of an elastic member containing a rubber member (Young's modulus: 4 to 40 MPa), and the light guide LG and the optical sheet OS are formed of, for example, comparatively soft resin such as acrylic or silicon resin (Young's modulus: 16 MPa). Each constituent member can exhibit linearly shrinking behavior to the load in the thickness direction of the liquid crystal display device 10 and linear pressing force sensing can be implemented by using such soft materials. In addition, a return speed of each member can be improved when the load in the thickness direction is reduced. Furthermore, if impulse such as drop is generated irrespective of sensing the pressing force, the impulse of the liquid crystal display device 10 can be absorbed and damage or breakage on the liquid crystal panel or the cover panel can be suppressed. In other words, the impulse absorption effect of the liquid crystal display device 10 can be improved.

The support frame 16, the light guide LG and the optical sheet OS can be formed of comparatively hard materials such as polycarbonate and PET, similarly to the conventional members. In this case, too, the impulse absorption effect can be obtained by forming the adhesive member TP in the double-layer structure. The impulse absorption effect can also be obtained even if the present embodiment is applied to a liquid crystal display device which does not comprise the pressing force sensing function.

From the above, the backlight device and the liquid crystal display device capable of widening the pressing force sensing range can be obtained according to the present embodiment. Moreover, the backlight device and the liquid crystal display device having a high impulse absorption effect can be obtained.

Next, a liquid crystal display device of the other embodiments will be described. In the other embodiments to be described below, portions similar to those of the first embodiment are denoted by the same reference numerals and detailed explanation is omitted or simplified, and portions different from those of the first embodiment will be particularly explained in detail.

Second Embodiment

Figure 8:
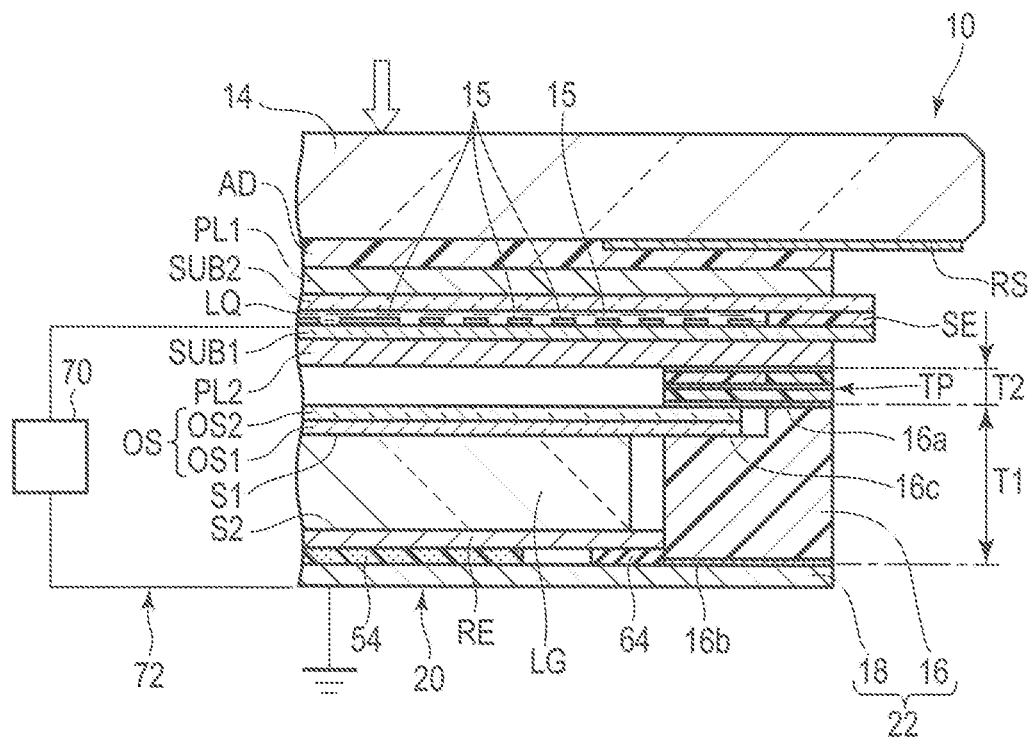
FIG. 8 is a cross-sectional view showing several parts of a liquid crystal display device according to a second embodiment.

FIG. 8 is a cross-sectional view showing a liquid crystal display device according to a second embodiment. According to the present embodiment, a spacer 64 is provided between a reflective sheet RE and a bottom plate 18 of a casing 22, around a cushion sheet 54. The spacer 64 has a thickness approximately equal to a thickness of the cushion sheet 54 and is opposed to a peripheral portion of a light guide LG.

The cushion sheet 54 can be prevented from being crushed in an initial state (i.e., a state of applying no pressing force) by providing the spacer 64. In addition, the light guide LG can be curved or deformed with the spacer 64 serving as a fulcrum, and deformation stroke (variation amount) at the liquid crystal panel 12 and the central portion of the light guide LG can be increased at input of the pressing force.

In the present embodiment, the planar size of each of the polarizers PL1 and PL2 is slightly smaller than the planar size of the liquid crystal panel 12. The peripheral portion of the liquid crystal panel 12 thereby slightly protrudes outwardly over the periphery of the polarizers PL1 and PL2.

Third Embodiment

Figure 9:
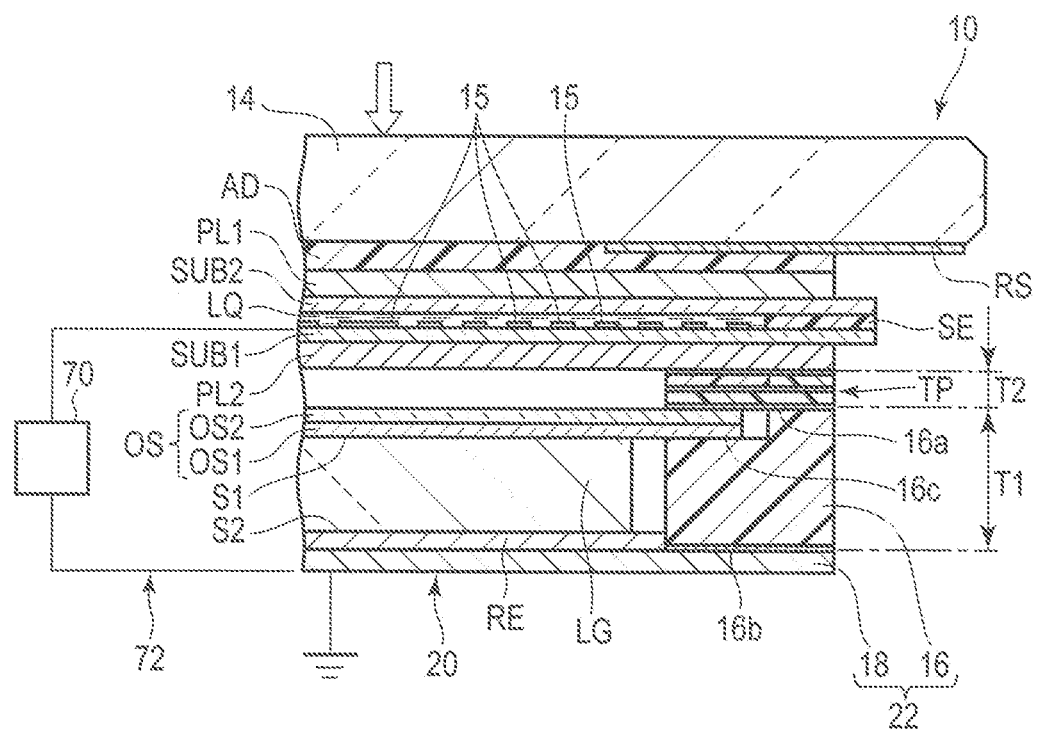
FIG. 9 is a cross-sectional view showing several parts of a liquid crystal display device according to a third embodiment.

FIG. 9 is a cross-sectional view showing a liquid crystal display device according to a third embodiment. In the present embodiment, a cushion sheet 54 is not disposed. In addition, a light guide LG is formed of a hard material such as glass (Young's modulus: 77,000 MPa).

In this configuration, too, a large amount of deformation stroke between the electrodes can be obtained at the time of applying load, by using the above-mentioned adhesive member TP of the double-layer structure. The rigidity of the light guide LG can be increased and the return speed of the light guide LG can be made higher at the time of reducing the load, by forming the light guide LG of a hard material. A speed of response to an input operation is thereby made higher.

In the second and third embodiments, too, the same advantages as the above-explained advantages of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes which can be implemented by a person of ordinary skill in the art through arbitrary design changes to the structures described above as embodiments of the present invention come within the scope of the present invention as long as they are in keeping with the spirit of the present invention. In addition, other effects which can be obtained by the above embodiments or modified examples and are self-evident from the description in this specification or can be arbitrarily conceived by a person of ordinary skill in the art are considered to be achievable by the present invention as a matter of course.

The structure of the adhesive member is not limited to the above-explained double-layer structure but can be a stacked layer structure of three or more layers. The outer shape and the inner shape of the liquid crystal panel and the constituent members of the backlight unit are not limited to the rectangular shape, but either or both of the outer shape and the inner shape may be the other shape such as a polygon in planar view, a circle, an ellipse and a combination of these shapes. The materials of the constituent members are not limited to the above-explained examples but can be variously selected.

What is claimed is:

1. A display device comprising:
a liquid crystal panel comprising a pair of substrates opposed to each other, a liquid crystal layer between the substrates, a first electrode portion on at least one of the substrates and a pair of polarizers that sandwich the substrates;
a backlight device comprising a casing including a support frame, a bottom plate fixed to the support frame, a light guide in the casing, at least one optical sheet on the light guide, a light source in the casing, configured to incident light on the light guide; and
an adhesive member between the liquid crystal panel and the backlight device to stick the backlight device to the liquid crystal panel, wherein
the support frame includes a highest top surface, a bottom surface and a step portion recessed from the top surface, and the optical sheet is placed on the step portion,
the adhesive member comprises a back surface fixed over the optical sheet and the highest top surface of the support frame, and a top surface fixed to one of the polarizers,
a width of the adhesive member is as same as a width of the support frame, and
an outer periphery of the adhesive member is flush with an outer periphery of the highest top surface of the support frame.

2. The display device according claim 1, wherein
a depth of the step portion from the highest top surface of the support frame is formed to be approximately equal to a sum of thickness of the at least one optical sheet placed on the step portion.

3. The display device according to claim 1, wherein
the at least one optical sheet is facing to the support frame at the step portion with a gap.

4. The display device according to claim 1, wherein
an outer side of the support frame forms an outer side of the casing.

5. The display device according to claim 1, wherein
the casing further comprises a bottom plate, and
the bottom surface of the support frame is covered with the bottom plate.

6. The display device according to claim 5, wherein
the bottom plate is made of metal material.

7. The display device according to claim 6, wherein
the support frame is made of rubber material.

8. The display device according to claim 7, wherein
a controller is connected to the first electrode portion and the bottom plate, the controller is configured to detect a change of a distance between the first electrode portion and the bottom plate by generate capacitance between them.

9. The display device according to claim 1, wherein
an uppermost surface of the at least one optical sheet faces the polarizer with a gap, and a width of the gap is the same as a thickness of the adhesive member.
10. The display device according to claim 1, wherein
the adhesive member includes a plurality of bases stacked in a thickness direction of the adhesive member, and adhesive layers on surfaces of the bases.

\* \* \* \* \*